3,692,494
BANK OF MIXER SETTLERS
André Bathellier, 1 Boulevard Colbert, 92 Sceaux, France, and Gérard Faudot, 118 Rue de Javel, 75 Paris 15 eme, France
Filed Feb. 7, 1969, Ser. No. 797,636
Claims priority, application France, Feb. 14, 1968, 139,892
Int. Cl. B01d 11/04
U.S. Cl. 23—270.5                                    3 Claims

ABSTRACT OF THE DISCLOSURE

A bank of mixer-settlers consisting of a plurality of serially-disposed stages each comprising a substantially vertical supply duct for a relatively heavy liquid phase which is fed into said duct by overflow, a substantially vertical supply tube for a relatively light liquid phase which is also fed into said tube by overflow, a mixer which is joined to the lower portions of the duct and of the tube and provided with agitation means, a settler which is connected to the top portion of the mixer by means of a spillway and joined to the supply tube of the preceding stage, a block within each settler for reducing the cross-sectional area at the level of the interface.

---

Figure 1:
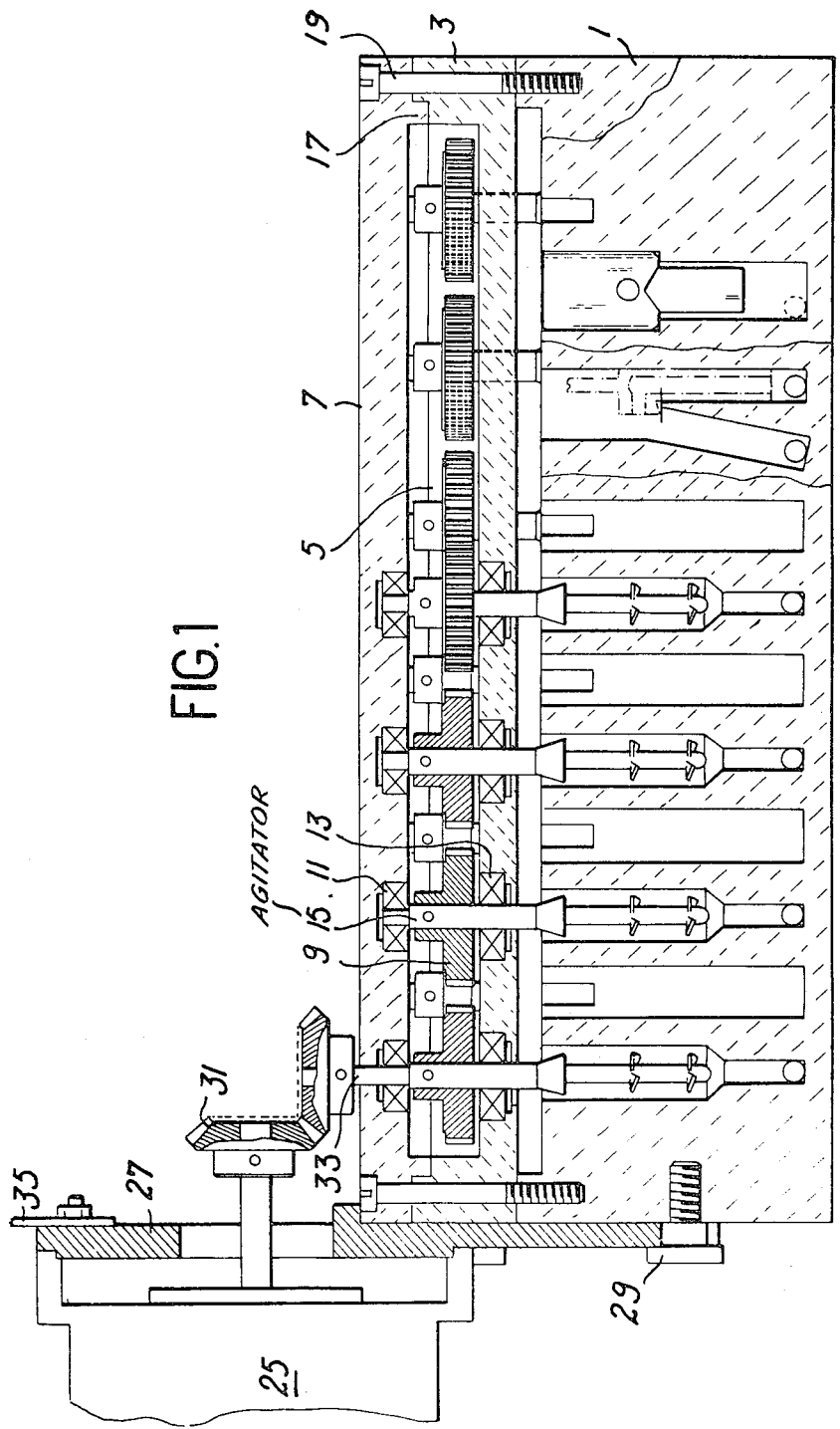

The present invention relates to a bank of mixer-settlers of very small size which are disposed in a plurality of stages associated in series and intended for liquid-liquid extraction by countercurrent flow, especially of an aqueous phase and an organic phase which is immiscible with water.

The main object of the invention is to provide an apparatus which satisfies the different practical requirements more effectively than has been the case up to the present time, particularly insofar as it offers the following advantages:

extremely small size which makes it possible to employ the apparatus for the purpose of processing very small volumes of solutions of either rare or highly radioactive products;
total visibility of all structural elements by virtue of a judicious choice of construction materials;
chemical inertness of all construction materials;
single-motor drive for ensuring equal speeds of rotation of all mixer agitators;
the possibility, coupled with the extremely small size of the apparatus, of permitting a range of total throughputs (aqueous phase plus organic phase), the extreme values of which are as low as 10 to 80 ml./hr.;
ratios of residence time of organic phase to residence time of aqueous phase which can very between 10 and less than 0.3.

The bank of mixer-settlers is characterized in that each stage comprises:

a substantially vertical supply duct for a heavy liquid phase, said tube being fed by overflow;
a substantially vertical supply tube for a light liquid phase, said tube being also fed by overflow and the lower end thereof being connected to the lower end of said supply duct;
a mixer which is connected at the base thereof to the lower portions of said duct and of said supply tube and which is provided with agitation means;
a settler which is connected at the top by means of a spillway to the top portion of the mixer and is provided with a top outlet through which the light phase passes and which is connected to the supply tube of the preceding stage, said settler being also provided with a bottom outlet through which the heavy phase passes and which communicates with the supply duct of the following stage.

In accordance with a preferred embodiment of the invention, the duct through which the heavy phase flows is provided with a movable spillway.

In accordance with a second preferred embodiment, the volume of the settler is partially reduced.

The bank of mixer-settlers according to the invention is preferably formed in two sections mounted one above the other and separated by a seal, wherein an upper section forming a casing and a cover contains a set of gears and antifriction bearings which transmit the motion of a motor to shafts which penetrate into a lower section, there being formed in said lower section the openings, ducts and free spaces which constitute the different stages of the bank.

Apart from the superior properties which were referred to earlier, the bank of mixer-settlers also provides a number of advantages among which can be mentioned:

imperviousness to the outer atmosphere, thereby permitting the use of an internal atmosphere and the use of gaseous reagents;
the possibility of adjustment of the level of the interface within the settlers by virtue of a movable spillway for the delivery of the aqueous phase;
the transfer by overflow of the emulsion, of the light phase and of the heavy phase makes it possible to avoid the need for any communication between stages even during shutdown of the apparatus.

The complementary description which now follows and the accompanying drawings will in any case serve to gain a better understanding of the invention and are given primarily by way of indication without any limitation being thereby implied.

Figure 2:
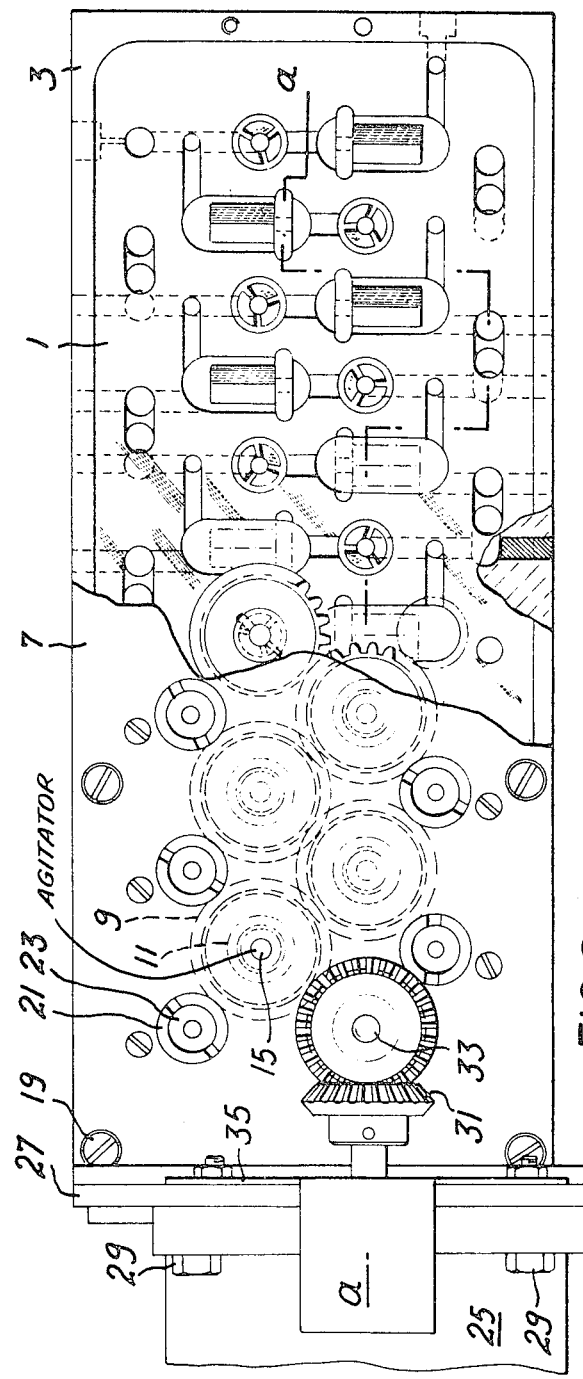
Figure 3:
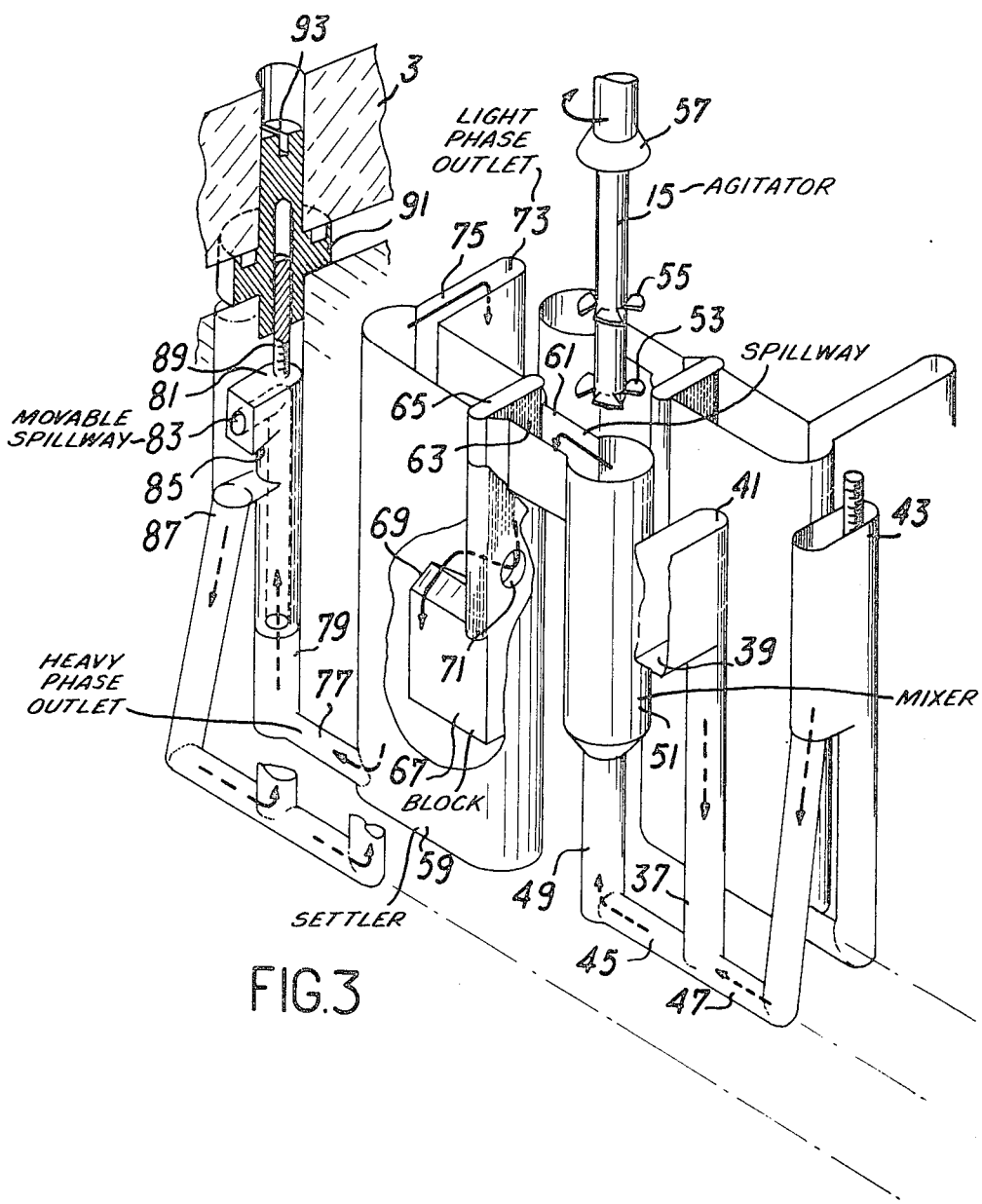

In these drawings:

FIG. 1 is a vertical sectional view of a bank of mixer-settlers in accordance with the invention;
FIG. 2 is a top view showing a bank of mixer-settlers in accordance with the invention, the cover and upper block having been partly broken away;
FIG. 3 is a view in isometric perspective showing the different cavities which form one of the stages of the lower block of a bank of mixer-settlers in accordance with the invention.

As can be seen from FIGS. 1 and 2, a bank in accordance with the invention is made up of two blocks 1 and formed of transparent plastic material.

A number of openings are bored or milled in the block 1 for the mixtures, settlers and various ducts in which a relatively heavy aqueous phase and a relatively light organic phase are circulated in countercurrent flow, as will be described hereinafter.

In the block 3 which forms the casing 5 with its cover 7, there are placed gears such as the gear 9 and anti-friction bearings such as the bearings 11 and 13 which serve to guide the shafts of agitators such as the agitator 15. The need to ensure perfect alignment of the two bearings 11 and 13 of a same shaft 15 has made it necessary to insert the cover 7 in the block 3 at 17. A flat seal (not shown in the drawings) provides leak-tightness between the blocks 1 and 3 and is compressed by means of screws such as the screw 19.

Openings such as the openings 21 (shown in FIG. 2) which are formed in the cover 7 are sealed off by means of rubber discs such as the disc 23 which can be readily pierced by means of a hypodermic needle for taking check samples.

An electric universal motor 25 is fixed on a removable plate 27 which is positioned by means of three studs such as the stud 29. Said motor drives by means of a mitergear 31 the first agitator shaft which extends at 33 externally of the casing cover. A handling lug 35 is provided for instantaneous replacement of the motor unit.

A twelve-stage bank as thus constituted has the following non-limitative properties:

| | | |
|---|---|---|
| Length | mm | [1] 220 |
| Height | mm | [1] 85 |
| Width | mm | [1] 90 |
| Weight empty | g | [1] 2,000 |
| Weight with motor | g | [1] 3,230 |

[1] Excluding motor.

Referirng more particularly to FIG. 3 in conjunction with the two other figures, there will now be described the circulation of liquids within the lower block 1 of the apparatus, the different cavities of which will be described at the same time.

The organic phase which is derived from the settler of the $n+1$ stage falls into the tube 37 by overflow on the horizontal surface 39 of the channel 41 (outlet of the $n+1$ stage).

The aqueous phase of the movable spillway 43 of the $n-1$ stage flows down to the solvent within the horizontal passage 45 via the inclined duct 47.

Access to the cylindrical mixer 51 is gained by way of the riser or well 49. The well is of fairly substantial depth and of small cross-sectional area and makes it possible with a small quantity of liquid and in conjunction with the tube 37 and the duct 47 to maintain a reserve quantity of liquid beneath the mixer and thus to prevent the aspiration of gas bubbles which are highly detrimental to efficient operation of the impeller blades 53 and 55.

The aspiration of the two phases and the formation of emulsion are ensured by means of two impellers each comprising four blades 53 and 55 carried by the same shaft 15. Said blades must be very thin in order to shear the liquid which is in contact and to ensure that rotational motion of the liquid is not induced by application of a thrust. A cone 57 is made integral with the shaft 15 and, by virtue of centrifugal ejection, is intended to prevent any upward flow of liquid into the gear casing.

The emulsion which is formed within the mixer falls by flowing over the spillway 61 into the settler 59 which has the shape of a rectangular parallelepiped having rounded ends. Said settler comprises a well 63 for the downflow of emulsion, said well being formed by a removable wall 65 which is engaged within two vertical grooves of the inner wall of the settler.

The partition wall 65 is adapted to carry at the lower end thereof a block 67 which is thus freely suspended in the liquid at a distance of a few millimeters from the lateral walls of the settler. Said block is of generally rectangular shape and is provided at the top with a ridge roof 69 having a double slope and designed to facilitate the downflow of drops of aqueous phase which form thereon as a result of resolution of the emulsion. The position of the block 67 has been so determined that the variations in level of interface which are produced by the movable spillway take place betwen the base of the block and its summit.

The design function of the suspended block 67 is as follows:

The uniform supply of emulsion to a settler causes an accumulation of aqueous phase at the bottom of this latter. When the level of the interface reaches a height H1 which is such that the hydrostatic equilibrium must induce a flow of aqueous phase over the corresponding spillway, the surface tension of the aqueous solution at the level of the spillway acts in opposition to said flow. In consequence, the interface continues to rise within the settler up to a height H2 which is sufficient to ensure that the excess of hydrostatic pressure which is thus developed compensates for the pressure of superficial origin. The flow of aqueous phase is started and only stops when the interface has fallen to H1; the volume V of discharged aqueous phase: $V=(H2-H1)$ S (wherein S is the surface area of a horizontal cross-section of the settler) must be low compared with the volume of the mixer which receives said aqueous phase, If this condition is not complied with, the mixer will violently reject the solvent phase contained therein.

In order to reduce the volume V of discharged aqueous phase and therefore in order to increase the frequency of discharge (the flow rate of aqueous phase being constant), the term S is reduced by introducing into the setttler a suspended block which has the effect of reducing the surface area at the level of the interface.

An orifice 71 provides a communication between the downflow well 63 and the settler 59 so as to remove any solvent which may have settled prematurely.

The solvent which is delivered from the settler falls into the tube 73 of the $n-1$ stage (corresponding to the tube 37 of the $n$ stage) by overflow on the horizontal surface of the outlet 75.

The aqueous phase flows through the duct 77 and flows upwards within the riser or well 79 under the action of hydrostatic pressure. Said aqueous phase then comes into contact with a stainless steel cylinder 81 which is pierced axially and opens by way of a short perpendicular passageway at 83 onto a flat face of said movable spillway. The underface 85 is inclined in order to prevent stagnation of liquid drops and the aqueous phase then falls directly into the duct 87 to be conveyed through this latter to the $n+1$ stage (corresponding to the duct 47 which provides a communication between the $n-1$ and $n$ stages). Leaktightness between the cylinder of the movable spillway and the walls of the well 79 is ensured by high-precision machining.

The movable spillway has a special shape and performs a very important function. In addition to permitting adjustment of the level of the interface within the corresponding settler and offering the possibility of maintaining at any desired value the ratio of residence time of organic phase to residence time of aqueous phase irrespective of the flow rates of the two phases considered, said spillway ensures a continuous flow of the aqueous phase. Systems which are designed on the principle of transfer by overflow onto a horizontal surface or even over a sharp ridge cannot achieve the same continuity of flow. But on this scale of operation, the surface tension of the aqueous phase assumes real significance. The fall by overflow of several drops which have accumulated on a spillway causes total disequilibrium of the following stage since the volume of these drops represents a not negligible proportion of the volume of the disturbed stage. The upward and downward motion of the movable spillway is produced by means of a screw-and-nut system. Thus, the movable spillway carries the nut 89 whilst the nut 91 which is intended to engage with said screw can be driven in rotation by producing action upon the slot 93.

The relative positions of the different stages are such that the aqueous and organic phases circulate countercurrentwise throughout the miniature bank of mixer-settlers.

What we claim is:

1. A bank of mixer-settlers disposed in a plurality of stages associated in series, each stage comprising
   a substantially vertical supply duct for a first phase, said duct being fed by overflow;
   a substantially vertical supply tube for a second phase, said tube being fed by overflow and the lower end thereof being connected to the lower end of said supply duct;
   a mixer connected at the base thereof to the lower portions of said duct and of said supply tube, agitation means for said mixer;
   a settler connected at the top by a spillway to the top portion of said mixer, a top outlet for said settler through which the lighter phase passes associated with the supply tube of the preceding stage, a bottom outlet for said settler through which the heavier phase passes communicating with the supply duct of the following stage, and a single solid substantially rectangular parallelepipedal block having substantial height dimension in said settler reducing the cross-sectional area thereof at the level of the interface between the phases and a double sloped ridge on the top of said block facilitating the flow of the heavier phase.

2. A bank of mixer-settlers in accordance with claim 1, said duct through which the heavy phase flows having a movable spillway and means for adjusting the position of said movable spillway.

3. A bank of mixer-settlers in accordance with claim 1, said mixer having at the upper extremity thereof a cone for the centrifugal ejection of the emulsion.

References Cited
UNITED STATES PATENTS

| | | | |
|---|---|---|---|
| 3,362,791 | 1/1968 | Ryon | 23—267 |
| 3,489,526 | 1/1970 | El-Roy et al. | 23—270.5 |

NORMAN YUDKOFF, Primary Examiner

S. SILVERBERG, Assistant Examiner

U.S. Cl. X.R.

23—310